(12) United States Patent
Yoon et al.

(10) Patent No.: US 6,984,920 B2
(45) Date of Patent: Jan. 10, 2006

(54) LINEAR PIEZOELECTRIC ULTRASONIC MOTOR

(75) Inventors: Seok Jin Yoon, Seoul (KR); Hyun Jai Kim, Seoul (KR); Ji Won Choi, Seoul (KR); Chong Yun Kang, Seoul (KR); Dong Kyun Lee, Kyonggi-do (KR); Piotr Vasiljev, Vilnius (LT)

(73) Assignee: Korea Institute of Science and Technology, Seoul (KR)

( * ) Notice: Subject to any disclaimer, the term of this patent is extended or adjusted under 35 U.S.C. 154(b) by 37 days.

(21) Appl. No.: 10/211,868

(22) Filed: Aug. 2, 2002

(65) Prior Publication Data

US 2003/0178915 A1 Sep. 25, 2003

(30) Foreign Application Priority Data

Mar. 22, 2002 (KR) ................................. 2002-15680

(51) Int. Cl.
*H01L 41/08* (2006.01)
(52) U.S. Cl. ........................ 310/323.12; 310/323.02; 310/323.19
(58) Field of Classification Search ........... 310/323.02, 310/323.12, 323.16, 325, 328
See application file for complete search history.

(56) References Cited

U.S. PATENT DOCUMENTS 4,562,374 A * 12/1985 Sashida ...................... 310/328
5,448,128 A * 9/1995 Endo et al. ............. 310/323.12

* cited by examiner

*Primary Examiner*—Mark Budd
(74) *Attorney, Agent, or Firm*—Harness, Dickey & Pierce, P.L.C.

(57) ABSTRACT

The present invention relates to a linear motor which draws its operating power from ultrasonic vibration above the frequency of 20 kHz which is generated by piezoelectric ceramic. More particularly, the invention relates to a linear piezoelectric ultrasonic motor which linearly operates a slider due to a frictional force generated by applying sinusoidal electric field with a 90 degree phase difference to a pair of piezoelectric ceramic. This causes an elliptical mechanical vibration on a shaking beam which is connected to the piezoelectric ceramic.

6 Claims, 3 Drawing Sheets

LINEAR PIEZOELECTRIC ULTRASONIC MOTOR

BACKGROUND OF THE INVENTION

The present invention relates to a linear motor which draws its operating power from ultrasonic vibration above the frequency of 20 kHz which is generated by piezoelectric ceramic. More particularly, the invention relates to a linear piezoelectric ultrasonic motor which linearly operates a slider due to a frictional force generated by applying sinusoidal electric fields with a 90 degree phase difference to a pair of piezoelectric ceramic. This causes an elliptical mechanical vibration on a shaking beam which is connected to two half wave resonators.

For the case of an electrically operated motor such as a solenoid that moves a relatively short distance, its rotating movement should be converted to a linear movement using a gear or a pulley. As a result, when a large force is required, its size and weight becomes too excessive.

Also, an electro magnetically driven motor has a number of disadvantages such as an excessive heat generation and large current requirement. Especially, the motor in a high temperature environment such as near a car engine is prone to malfunction.

A Linear piezoelectric ultrasonic motor has a number of advantages such as the light weight, low power consumption, and possible linear motion without a gear. Also, its speed, and position can be controlled electrically.

Moreover, a forward and reverse motion is possible and there is no slippage during a stop.

The linear piezoelectric ultrasonic motors can be classified based on their operating methods such as a traveling wave type which operates the motor using a traveling wave generated from a flexural wave, and a standing wave type which generates a repeated horizontal and vertical vibration by combining the longitudinal vibration and transversal vibration of an actuator in order to operate the slider.

The standing wave type linear piezoelectric ultrasonic motor basically uses a multiple vibration by combining each actuator that has a different type of operation mode. The standing wave type linear piezoelectric ultrasonic motor comprises an actuator which operates in vertical and horizontal directions and the contacted section transfers a mechanical vibration to the slider.

The longitudinal vibration of a piezoelectric ceramic is transferred to a vibrating part (contact section) which is in contact with the slider and the slider operates due to the friction at the contact part.

Although many different methods are proposed for vibration transfers, no practical method has been realized due to the difficulty in securing a mechanism for the effective operating power transfer to obtain a constant vibration amplitude.

SUMMARY OF THE INVENTION

The present invention is designed to overcome the above problems of prior art. The object of the present invention is to provide a linear piezoelectric ultrasonic motor from which a linear motion can be directly generated by applying sinusoidal alternating electric fields with a 90 degree phase difference to a pair of piezoelectric actuators vibrating at an ultrasonic level. The linear piezoelectric ultrasonic motor according to the present invention is capable of a forward and reverse motion by changing the phase of an alternating electric field. The motor has a precise position control in the range of nm using a DC voltage.

Also, another object of the present invention is to provide a linear ultrasonic motor which can magnify the longitudinal vibration generated by piezoelectric ceramic and comprises a structure that can transfer an elliptical vibration to a slider as well as suppressing the abrasion due to the friction between the slider and fixed body by selecting an abrasive resistant material between them.

The linear piezoelectric ultrasonic motor according to the present invention comprises a plurality piezoelectric ceramics which generates mechanical vibration, a horn which is located at the lower part of said piezoelectric ceramics and magnifies the amplitude of vibration, a pair of half-wave resonators on which said piezoelectric ceramic are firmly fixed by bolts, a protruding section which is located at the center of a shaking beam connected to said two half-wave resonators and generates an elliptical vibration when applied by electric fields with two different phases and a slider which is in contact with said protruding section and operates linearly due to the friction between them.

DETAILED DESCRIPTION OF THE EMBODIMENTS

Hereinafter, preferred embodiments of the present invention will be described in detail with reference to FIGS. 1(*a*) and 1(*b*).

Figure 2:
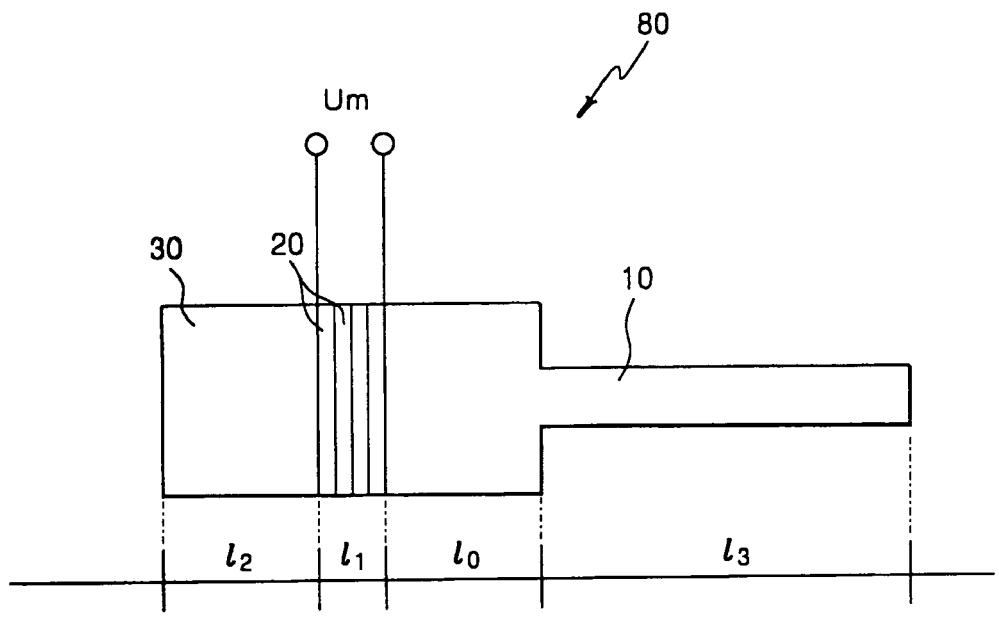
FIG. 2 shows a detailed construction of the half-wave resonator in FIG. 1.
Figure 3:
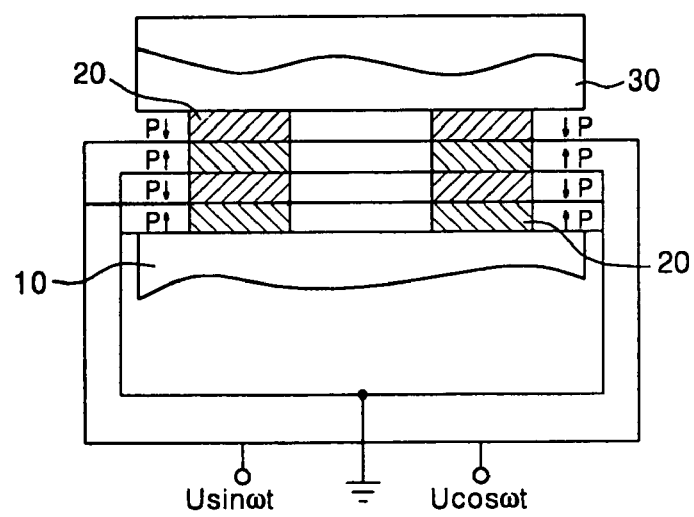
FIG. 3 shows the piled layers and electrical wiring of the piezoelectric Ceramic in FIG. 1

FIG. 2 shows a detailed structure of a half-wave resonator. A horn 10 of the half-wave resonator 80 acts as a magnifier which magnifies the amplitude of vibration which is generated from a piezoelectric ceramics. The length l of the horn 10 is determined by the mathematical equation 1

[Mathematical Equation 1]

$$l = \lambda/4$$

Here $\lambda$ is the wavelength of the piezoelectric actuator and l is $l_3$.

The best vibration for operating of the motor is obtained when a combined length of actuator and horn is ½ of the wavelength.

The length of the horn 10 with respect to the total length of a linear ultrasonic motor is determined by the mathematical equation 1. The amplitude of vibration generated by the half-wave transducer which acts as a half-wave resonator for longitudinal vibration is shown in the mathematical equation 2.

[Mathematical Equation 2]

$$\xi_3(-l_3) = \frac{d_{33}U}{\alpha_1} Y \frac{1}{\cos\alpha_3 + j\gamma_{lx}\sin\alpha_3}$$

Here, $d_{33}$ is a Piezoelectric constant, U is an applied voltage, $\alpha$ is $k*l$ (k: wave number, l: length), Y is Young's modulus, $\gamma_{1x}$ is a load factor.

The Young's modulus (Y) are shown in the mathematical equation 3.

[Mathematical Equation 3]

$$Y = \frac{\cos\alpha_2 - \phi_1(\alpha_1, \alpha_2)}{\gamma_{01}\sin\alpha_0\phi_1(\alpha_1, \alpha_2) - \cos\alpha_1\phi_2(\alpha_1, \alpha_2) - j\gamma_{lx}[\cos\alpha_0\gamma_{01}\phi_1(\alpha_1, \alpha_2) - \sin\alpha_0\phi_2(\alpha_1, \alpha_2)]}$$

Figure 1:
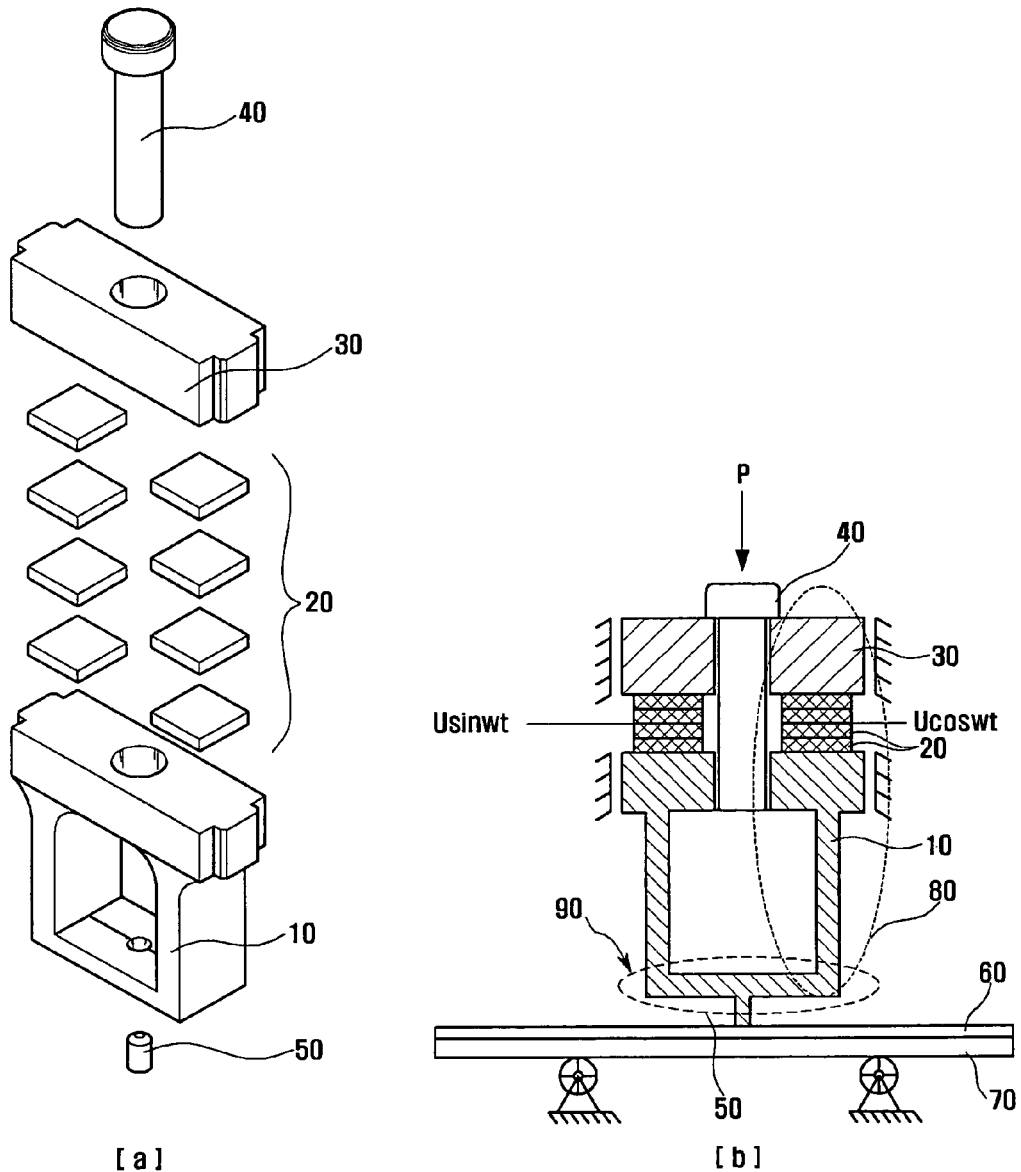
FIG. 1(*a*) and FIG. 1(*b*) show the construction of the linear ultrasonic motor according to the present invention.

$\phi_1(\alpha_1,\alpha_2) = \cos\alpha_1 \cdot \cos\alpha_2 - \gamma_{21}\sin\alpha_1 \cdot \sin\alpha_2$ Here, $\phi_2(\alpha_1,\alpha_2) = \sin\alpha_1 \cdot \cos\alpha_2 + \gamma_{21}\cos\alpha_1 \cdot \sin\alpha_2$ The linear ultrasonic motor comprising two half-wave resonators 80 which satisfies the above conditions has the construction as shown in FIG. 1.

As shown in FIG. 1, the linear ultrasonic motor according to the present invention comprises a horn 10, a pair of half-wave resonators 80, and a shaking beam 90. A plurality of piezoelectric ceramic 20 which generates a mechanical vibration is firmly fixed by bolts on the half-wave resonators 80 located at each end of horns 10 on a metal 30. A protruding section 50 which transfers an elliptical mechanical vibration is located at the center of the shaking beam 90.

A slider 70 comprises a frictional material 60 with an abrasive resistant characteristic and is tightly squeezed to the protruding section 50 through a spring force.

More specifically, the linear ultrasonic motor comprises a pair of half-way resonators 80 which vibrates longitudinally, hence, if alternating electric fields with two different phases (U sin ωt, U cos ωt) are applied to both sides of the half-wave resonators 80, then an elliptical mechanical vibration is generated at the protruding section 50.

Also, a precision movement can be secured by applying a DC voltage to the piezoelectric ceramic 20 and a precision in the range of nm can be obtained by applying an appropriate combination of alternating and DC voltage.

The Piezoelectric ceramic 20 generates a longitudinal vibration. The Piezoelectric ceramic 20 are piled onto each other with opposite polarization in order to apply a low voltage. They are firmly fixed by the bolt 40 between the horn 10 and metal 30.

On the upper section of the metal 30, a linear ultrasonic motor is pressed by under a constant pressure and is firmly fixed to the slider 70 using a pair of board spring.

In order to prevent an occurrence of mechanical noises during the operation of the linear ultrasonic motor, a rubber lining is inserted between the cover and board springs.

Also, in order to prevent an occurrence of mechanical noises between the metal and the contact part of the case, the internal sides of a main body is covered with a thermoplastic material such as Teflon.

The protruding section is manufactured by aluminum oxide ($Al_2O_3$) and Vanadium alloy which can reduce the abrasion due to friction and prolong the life cycle. As a frictional material in contact with the protruding section, a hard $Al_2O_3$ is used.

For the horn 10, stainless stain or Titanium alloy with a low acoustic resistance is used and for the protruding section 50 is $Al_2O_3$.

Figure 4:
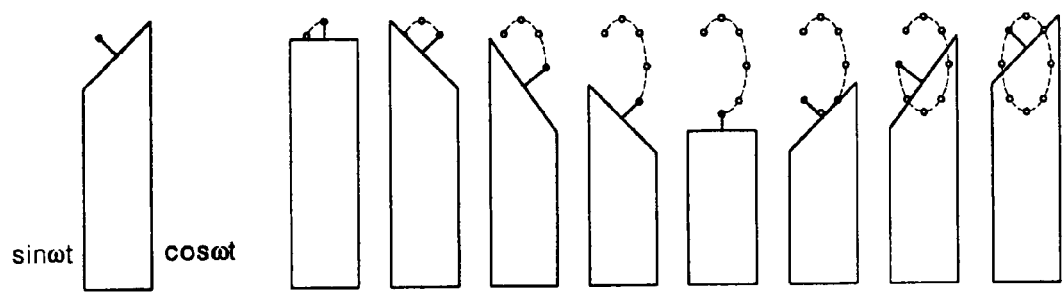
FIG. 4 shows the operation of the shaking beam which is the source of a linear ultrasonic motor

The operation of the linear ultrasonic motor with the above construction is as shown in FIG. 4. When alternating electric fields with two different phases are applied to the half-wave resonators 80, an elliptical mechanical vibration is generated at the protruding section 50 which is located at the center of the shaking beam 90. Due to the contraction and magnification of each of the piezoelectric ceramic 20 on the horn 10, the slider 70 in contact with the protruding section 50 moves linearly.

At this instance, the phase of one of the half-wave resonators 80 is changed 180 degree, and then the direction of the slider is reversed.

Also, if the length of the protruding section 50 is extended, then the moving speed increases however, the generating power decreases.

As shown so far, the linear ultrasonic motor according to the present invention can improve the operating condition of the entire vibration system by reducing the operating voltage as well as increasing the generation power and moving speed of the slider 70.

Also, the linear ultrasonic motor according to the present invention has a superior power in comparison to an Electromagnetically operated motor of the equivalent mass. Lubricant is not necessary since it is directly operated.

Especially, since the linear ultrasonic motor can be controlled precisely and high speed response (0.1 ms) characteristics, it can be utilized for a XYZ stage that requires a high precision, a steppers which is an alignment device for semiconductor fabrication and an actuator device attached to a satellite based telescope for precisely controlling the position.

What is claimed is:

1. A linear piezoelectric ultrasonic motor, comprising:
   a pair of ceramic elements, each ceramic element consisting of several piled rectangular piezoelectric ceramics;
   a top metal block which is attached to the upper end of said ceramic element;
   a bottom metal block having two horns, and a shaking beam and a bar connected across said two horns, which is attached to the lower end of said ceramic element;
   a high frequency power source having a resonant frequency of said linear piezoelectric motor;
   a slider which is in contact with a protruding section and operates linearly due to the friction between them.

2. The motor as claimed in claim 1, wherein the motor consists of two half-wave vibration resonators, each resonator consists of said ceramic element, metal block, and horn.

3. The motor as claimed in claim 1, wherein said shaking beam comprising:
   a beam connected at each end to two half-wave resonators driven out of phase with each other and a protruding section formed at the beam center to produce elliptical vibrations at the output end.

4. The motor as claimed in claim 1, wherein said piezoelectric ceramics are piled one upon another with different polarization each other.

5. The motor as claimed in claim 1, wherein the length (/) of said horn is a quarter of the wavelength of the vibration.

6. The motor as claimed in claim 1, wherein said high frequency power source generates two sinusoidal wave voltages with 90 degree phase difference.

* * * * *